Sept. 8, 1942.  W. L. ZINK  2,294,945
TRACTOR
Filed Oct. 4, 1939  5 Sheets-Sheet 1

William L. Zink
INVENTOR.

BY Eric S. Prime
ATTORNEY.

Sept. 8, 1942.  W. L. ZINK  2,294,945
TRACTOR
Filed Oct. 4, 1939  5 Sheets-Sheet 3

William L. Zink
INVENTOR.
BY
ATTORNEY.

Sept. 8, 1942.                    W. L. ZINK                    2,294,945
                                   TRACTOR
                              Filed Oct. 4, 1939                 5 Sheets-Sheet 4
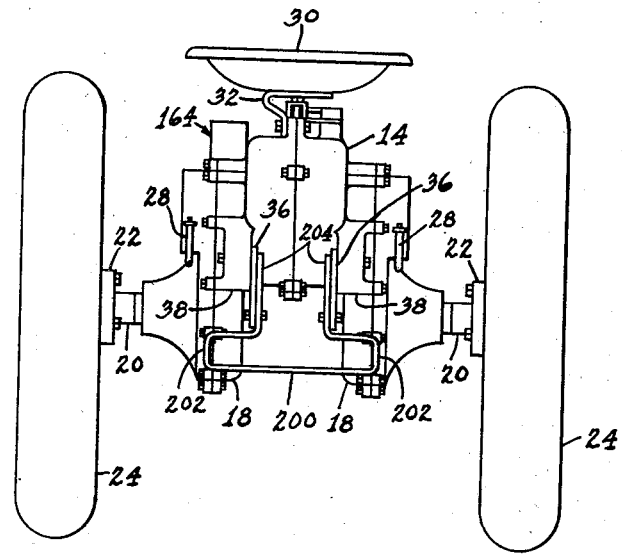
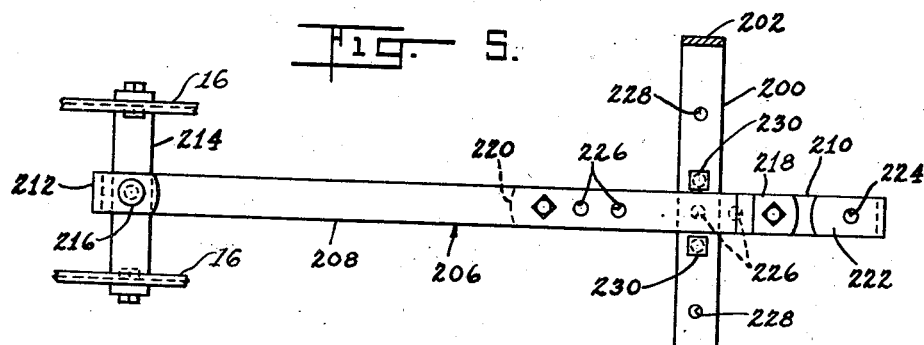
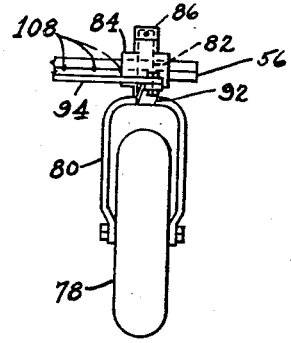
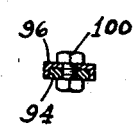
William L. Zink
INVENTOR.
BY *Eric B. Prime*
ATTORNEY.

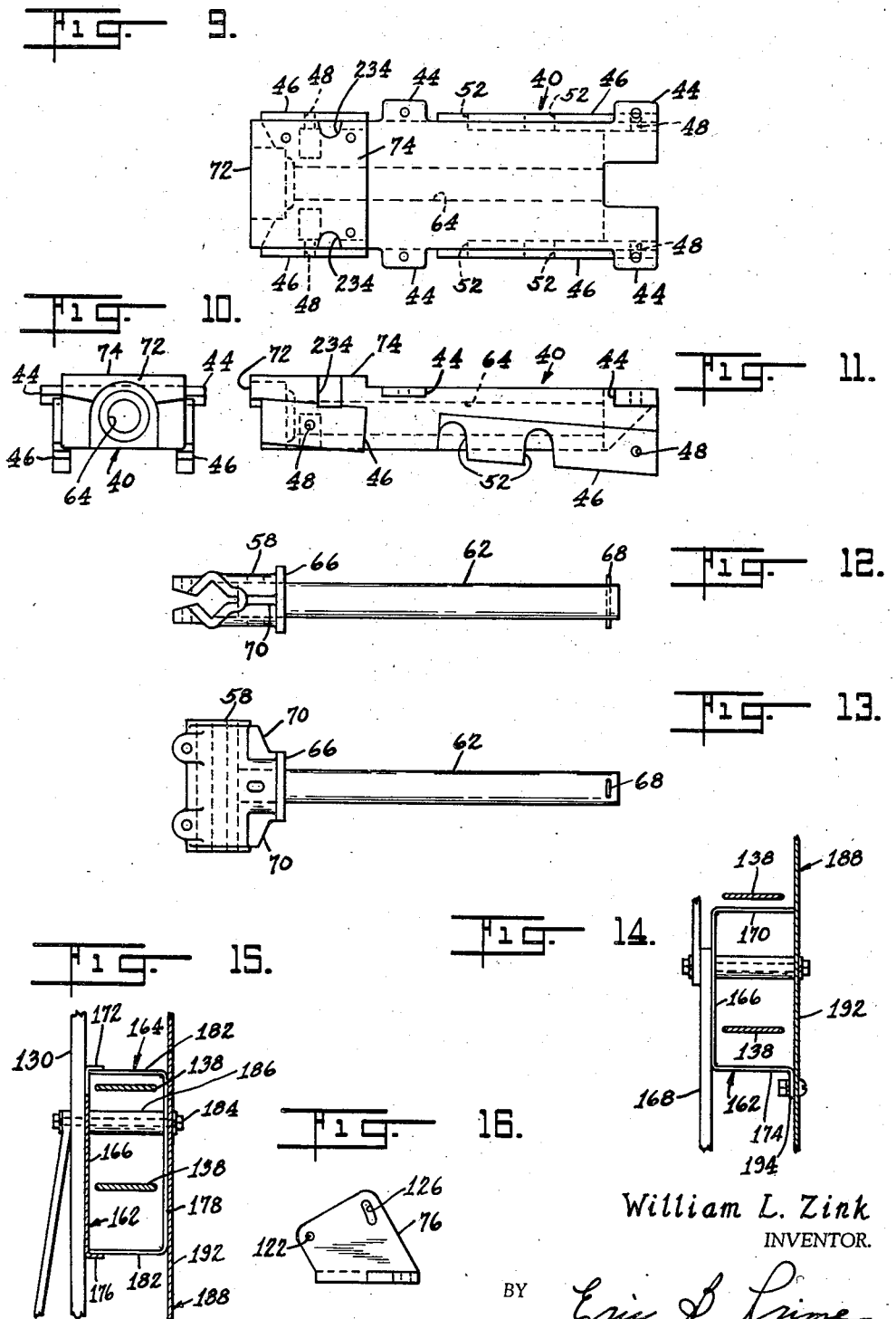

Patented Sept. 8, 1942

2,294,945

UNITED STATES PATENT OFFICE 2,294,945

TRACTOR

William L. Zink, Plano, Ill., assignor to Sears, Roebuck and Co., Chicago, Ill., a corporation of New York Application October 4, 1939, Serial No. 297,849

6 Claims. (Cl. 180—54)

This invention relates generally to automotive vehicles and more particularly tractors intended for use with agricultural implements such as cultivators, harrows, plows, and the like.

An object of this invention is to provide an improved and novel tractor structure which is particularly adapted for use with different types of agricultural implements or tools.

Another important object of the invention is to provide a tractor having an improved and novel structure for having the implements or tools attached thereto.

A further object of the invention is to provide a tractor having an improved and novel arrangement of the frame, the engine block, the transmission, and the controls.

Another object of the invention is to devise a tractor provided with an improved and novel engine block having the dual function of supporting the motor and serving as a mounting for the front axle structure.

Another important object of the invention is to provide an improved and novel construction and arrangement of the front axle and steering structures whereby the front wheels may be positioned different distances apart and implements or tools may be mounted on the front axle structure.

A further object of the invention is to provide a tractor having an improved and novel adjustable draw-bar construction and arrangement with the frame of the tractor.

Another object of the invention is to provide a tractor which is simple in construction and operation, and inexpensive to manufacture.

Other objects and advantages will be apparent from the following description.

In the accompanying drawings illustrating a preferred embodiment of the invention:

Figure 4 is a rear elevation of the tractor with the draw-bar removed;

Figure 5 is an enlarged detail plan view of the draw-bar structure;

Figure 2:
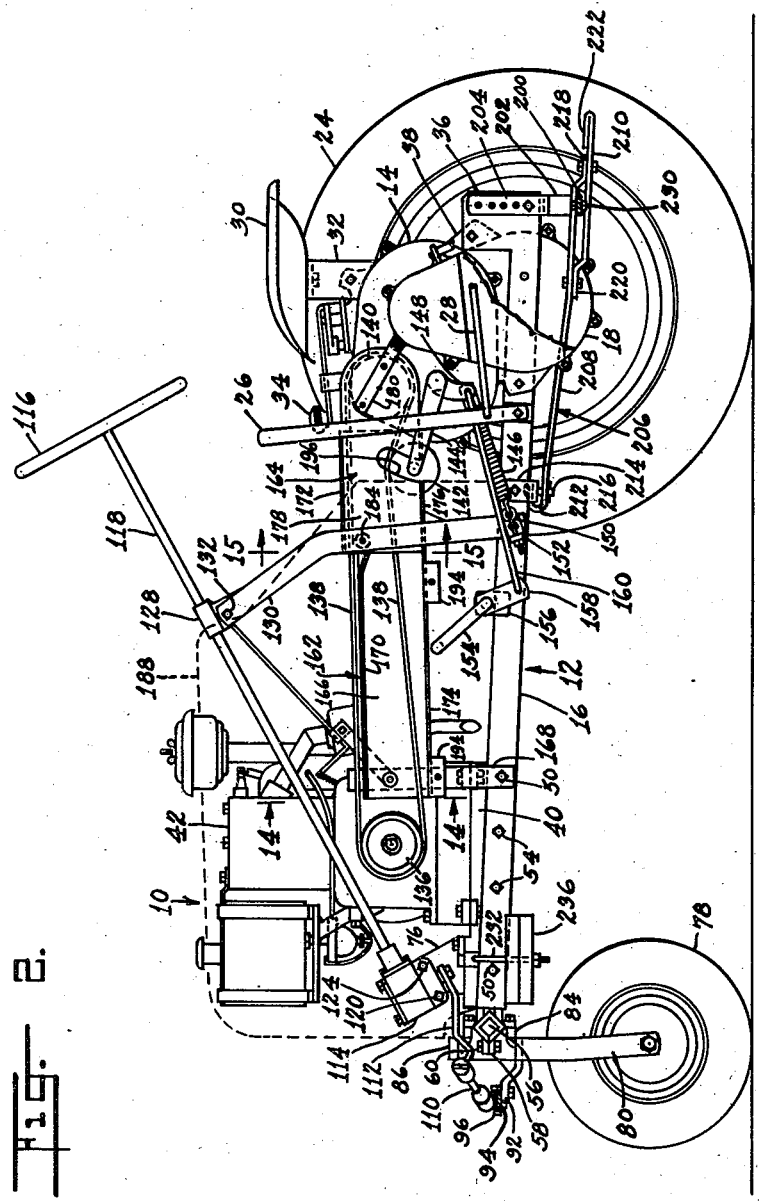
Figure 2 is a side elevation taken from the other side of the tractor, the hood and near rear wheel being removed and a fragment of the transmission housing being broken away.
Figure 3:
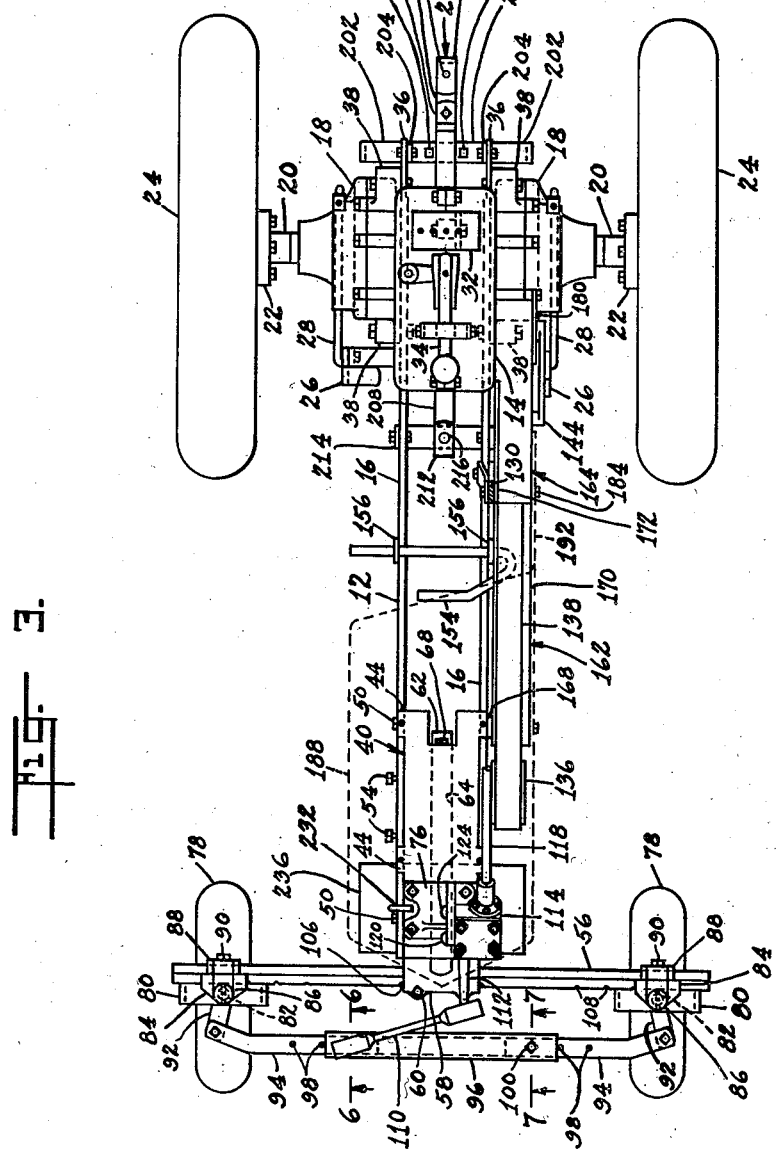
Figure 3 is a top plan view of the structure shown in Figure 2, the motor, seat, and steering wheel being removed.

Figures 6 and 7 are enlarged vertical sectional views taken substantially along the lines 6—6 and 7—7, respectively, of Figure 3;

Figure 8 is a fragmentary front elevation of a front wheel structure;

Figure 9 is an enlarged detail plan view of the engine block shown in Figure 3;

Figure 10 is an end elevation of the engine block in Figure 9;

Figure 11 is a side elevation of the structure shown in Figure 9;

Figures 12 and 13 are side and plan views, respectively, of the structure for connecting the front axle bar to the engine block;

Figures 14 and 15 are vertical sectional detail views taken substantially along the lines 14—14 and 15—15, respectively, of Figure 2; and Figure 16 is a detail elevational view of the bracket for mounting the steering mechanism on the engine block.

The embodiment of the invention, as illustrated in the accompanying drawings, provides a tractor referred to generally by the reference character 10, having a frame 12 and a transmission housing 14 containing a gear mechanism, not shown.

The frame 12 comprises a pair of spaced apart frame bars 16 preferably channel shaped in cross-section and positioned with the flanges thereof extending inwardly.

The gear mechanism in the transmission housing 14 is so designed that the housing 14 may be provided with a pair of spaced-apart depending housing portions 18 for receiving aligned axles 20 which are operatively connected with the gear mechanism within the housing 14.

Figure 1:
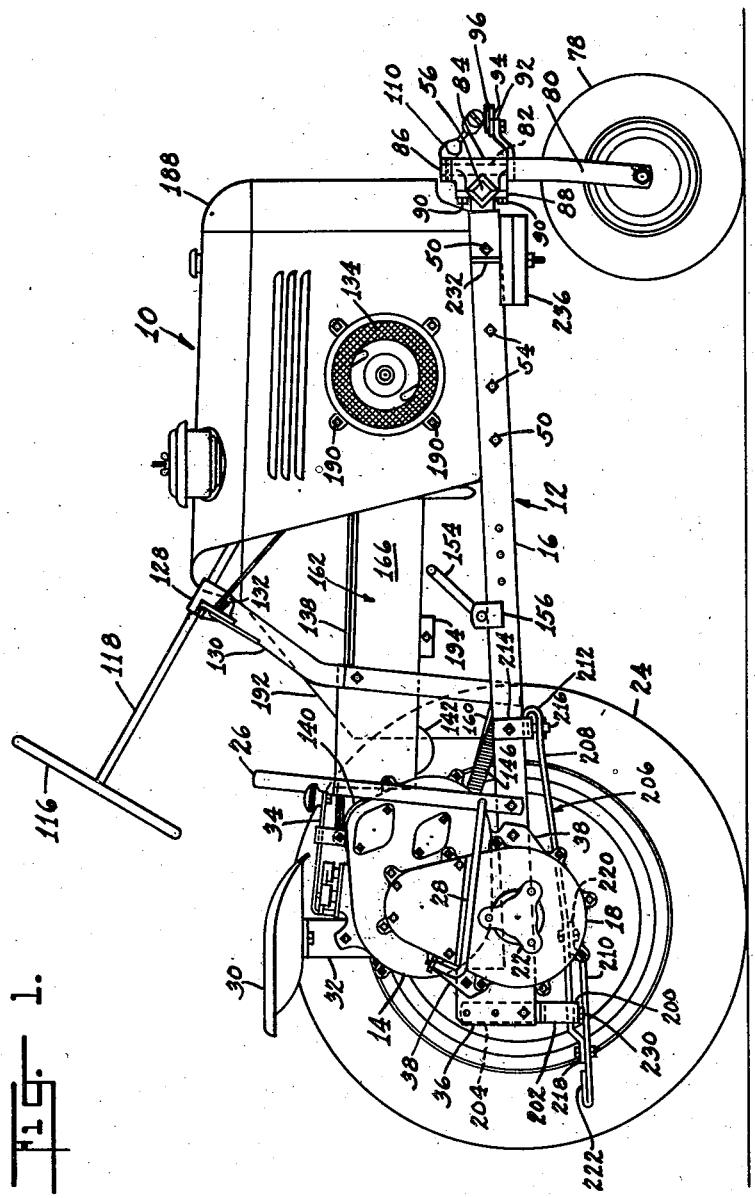
Figures 1 is a side elevation of a tractor embodying the present invention, the near rear wheel being removed.

As best shown in Figures 1 and 3, each of the axles 20 is provided with a head 22 for having the hub of a wheel 24 attached thereto.

The housing portions 18 are each provided with a braking mechanism, not shown, for braking the respective wheels 24, each of the braking mechanisms being manually operable by a lever 26 pivotally connected to the frame 12 and operatively connected to its respective braking mechanism by a rod 28.

A conventional seat 30 for the operator is positioned above the transmission housing 14 and mounted thereon by means of a bracket 32, and a shift lever 34 is conveniently positioned on the top of the transmission housing 14 and operatively connected to the transmission mechanism contained therein for controlling the operation of the rear wheels 24.

The frame bars 16 extend between the depending housing portions 18 of the transmission housing 14 and have the rear ends thereof fixedly connected to frame plates 36 by suitable means such as welding. The frame bars 16 and plates 36 are fixedly connected to flanges 38 integral with the housing 14 and housing portions 18 by means of bolts.

The frame bars 16 extend forwardly of the transmission housing 14 and are connected to a block 40 on which a motor 42 is mounted.

As best shown in Figures 9, 10, and 11, the block is provided with top flange portions 44 having openings therein for receiving the bolts which connect the motor to the block, and is also provided with projecting side portions 46 receivable between the inturned top and bottom flanges of the frame bars 16, for definitely positioning the block relatively to the frame bars, the block being provided with openings 48 extending through the side portions 46 for receiving bolts 50 (Figures 1 to 3) connecting the block to the frame bars. It will be noted tht the side portions 46 are provided with recesses 52 for receiving the heads of bolts 54 (Figures 1 to 3) which extend from the inside to the outside of the frame bars 16 for connecting attachments to the frame.

As seen in Figures 1 to 3, a combination axle and tool supporting bar 56 substantially square in cross-section, is positioned at the front of the tractor and is adjustably and fixedly retained in a clamping member 58 by means of bolts 60.

An arbor shaft 62 (Figures 3, 12 and 13) is journaled in an opening 64 (Figures 3, 9 to 11) extending longitudinally of the block 40, and extends into the clamping member 58 to which it is fixedly connected by any suitable means such as welding. The clamping member 58 has a shoulder 66 which engages the block 40 and acts as a thrust bearing for limiting longitudinal movement of the shaft in one direction and the other end of the shaft is provided with a stop such as a pin 68 for limiting the longitudinal movement of the shaft in the other direction.

The shaft 62 is free to oscillate relatively to the block 40, which oscillations are limited by means of stop portions 70 integral with the clamping member 58 and oppositely positioned relatively to the shaft 62. The stop portions 70 are arranged for engagement with a forwardly projecting portion 72 integral with and comprising a part of block 40 for limiting the oscillations of the clamping member. It will be noted that the block 40 is also provided with an elevated front portion 74 with which the forwardly projecting portion 72 is continuous and on which a bracket 76 shown in Figures 2, 3, and 16, is mounted, the bracket being connected with the steering mechanism.

Thus it will be seen that the block 40 ties and braces the frame bars 16, serves as a base for the motor and a bearing for the arbor shaft 62, and also provides a mounting for the steering mechanism.

As best shown in Figures 1, 3, and 8, a pair of wheels 78 is positioned at the front end and on opposite sides of the tractor for supporting and guiding the front end of the tractor. Each of the wheels 78 is rotatably mounted in a fork 80 having an upwardly extending spindle 82 fixedly connected therewith as by welding.

The spindle 82 is journalled in a bracket member 84 having a V-shaped recess for receiving the axle bar 56 and positioned on the front thereof. A cap 86 is connected to the top of the spindle 82 for retaining the spindle in the bracket 84.

The bracket member 84 is mounted on the axle bar 56 and adjustably connected therewith by means of a complementary bracket member 88 positioned on the opposite side of the axle bar 56 from the bracket member 84 and likewise provided with a V-shaped recess for receiving the axle bar. The complementary bracket member 88 is connected to the bracket member 84 for clamping the axle bar 56 therebetween, by means of screws 90 positioned above and below the axle bar 56 and extending through the complementary bracket member 88 and into threaded openings in the bracket member 84.

Each of the forks 80 is provided with a forwardly extending arm 92 fixedly connected therewith and pivotally connected to a cross arm 94. The cross arms 94 extend between the flanges of a channel cross bar 96 and are provided with a plurality of spaced apart openings 98 therein for being adjustably connected to the cross bar 96, one of the cross arms 94 being connected to the cross bar 96 by a bolt 100 as shown in Figures 3 and 7, and the other cross arm 94 being connected to the cross bar 96 by a bolt 102 having a ball shaped head 104, as shown in Figure 6.

The axle bar 56 may be provided with notches 106 in an edge thereof in order that the clamping member 58 may be centrally positioned on the axle bar 56 during assembly, and is also preferably provided with similar notches 108 spaced to correspond to the spacing of the holes 98 in the cross arms 94, so that the brackets 84 may be properly positioned on the axle bar 56 when the spaced apart positions of the wheels are changed.

It will be noted that when the front wheels 78 are to be positioned a lesser or greater distance apart, the bolts 100 and 102 are removed from the cross bar 96 and arms 94, and the screws 90 which are connected to the wheel brackets 84 are loosened. The wheels 78 then may be adjustably positioned as determined by the holes 98 and the notches 108, and may be spaced a considerable distance apart by utilizing a longer axle bar 56 and longer cross arms 94.

Thus it will readily be seen that ground working tools may be mounted on the axle bar 56 in which case the front wheels 78 also function as gauge wheels because both of the front wheels are always in engagement with the ground as a result of the front axle bar being free to oscillate about the axis of the oscillatable shaft 62.

Referring to Figures 2, 3, and 6, the ball 104 is receivable in the end of a drag link 110 which has the other end similarly connected to a steering arm 112. The steering arm 112 is operatively connected to a steering device 114 manually operable by a steering wheel 116 through the medium of a steering shaft 118.

The steering device 114 is connected to the bracket 76 hereinbefore referred to by a pair of bolts, a forward or pivot bolt 120 extending through an opening 122 in the bracket, and a rear or swinging bolt 124 which extends through a slot 126 in the bracket (Figures 3 and 16). The steering shaft 118 is supported by being journalled in a steering bracket 128 (Figures 1 and 2) connected to a post 130 by a bolt 132, the steering post 130 being fixedly connected to a frame bar 16.

When the tractor is to be shipped in commerce, the steering bracket 128 is disconnected from the steering post 130 by removing the bolt 132, and the bolt 124 connecting the steering device 114 to the bracket 76 is loosened whereby the steering wheel 116 and the shaft 118 may be swung downwardly so that the tractor may require a smaller box or crate for shipment. The bolt 124 may then be tightened for retaining the steering wheel in its lowermost position.

The motor 42, illustrated in the drawings, is an air cooled motor having an air intake screened opening 134 (Figure 1) on one side and a driving pulley 136 on the other side. The driving pulley 136 (Figure 2) is operatively connected by means of a belt 138 to a driven pulley 140 positioned on the exterior of the transmission housing 14 for driving the transmission mechanism contained therein.

As best shown in Figure 2, the tautness of the belt 138 is determined by an idle pulley 142 positioned on the underside of the belt 138 and carried by an arm 144 swingably connected to the transmission housing 14. The idle pulley 142 is normally retained in yielding engagement with the belt 138 for keeping the belt taut by means of a tension spring 146 having one end connected to a stub arm 148 integral with the arm 144, and the other end adjustably attached by means of an eye bolt 150 to an angle bracket 152 secured to a frame bar 16.

The tension of the spring 146 is overcome for releasing the pressure of the idle pulley 142 on the belt 138 and thereby permitting the belt to slip on the pulleys 136 and 140 for operatively disconnecting the motor from the transmission, by means of a manually operable oscillating foot lever 154 mounted in bracket plates 156 carried by the frame bars 16 and provided with an integral depending arm 158 which is attached to the stub arm 148 by means of a rod 160. Thus, it will be seen that the foot operated idle pulley structure functions in the manner of a clutch for dissociating the motor from the transmission.

As shown in Figures 2, 14, and 15, the belt 138 is provided with a guard comprising an inner section 162 and an outer section 164. The inner section 162 has a side wall portion 166 supported on a standard 168 carried by a frame bar 16, and top wall portions 170 and 172, the top wall portion 170 extending outwardly beneath the top forward portion of the belt, and the top wall portion 172 extending outwardly above the top rear portion of the belt. The inner section 162 is also provided with bottom wall portions 174 and 176 which extend outwardly beneath the lower portion of the belt.

The outer guard section 164 is likewise provided with a side wall portion 178 which is attached to the transmission housing 14 by means of a strap 180, and has top and bottom wall portions 182 which extend inwardly between the top and bottom wall portions 172 and 176, respectively, of the inner section.

The inner and outer guard sections 162 and 164, respectively, are further supported by the post 130, through a bolt 184 which extends through openings in the side walls of the sections, the side walls being spaced the proper distance apart by means of a spacing element 186 disposed on the bolt 184 and positioned between the side portions.

A cowling or hood 188 is disposed over the motor and has a side provided with the opening 134 through which air may pass to the motor. The side of the cowling having the air intake opening is connected to the motor by means of screws 190, and the other side 192 of the cowling is positioned exteriorly of the belt 138 and belt guard, and is connected to the standard 168 and the post 130 by the same elements which connect the belt guard section thereto. The guard section 162 is also illustrated as being provided with flanges 194 for being connected to the cowling.

Thus it will be seen that the cowling not only covers the belt but also functions as a belt guard and prevents outward creeping of the belt. Inward creeping of the belt is prevented by the side wall 166 of the guard section 162, and the top and bottom walls 170 and 174 of the guard section 162 support the belt when the pressure of the idle pulley 142 on the belt 138 is released. As shown in Figure 2, the side wall 178 of the outer guard section 164 is provided with an opening 196 therein through which extends the arm 144 on which the idle pulley 142 is mounted, in order that the arm and idle pulley may be operated.

As best shown in Figures 1 to 5, inclusive, a drawbar structure is provided whereby certain types of equipment may be attached to the tractor. The drawbar structure comprises a guide member or bar 200 having U-shaped side portions 202 terminating in upwardly extending end portions 204 which are positioned on the inner sides of the frame plates 36 and connected therewith by means of bolts. The frame plates 36 and the end portions 204 of the guide member 200 are provided with a plurality of holes for receiving the bolts in order that the guide member may be adjustably positioned vertically relatively to the frame plates 36. It will be noted that the U-shaped portions 202 of the guide member 200 extend beneath the frame plates 36 and limit the uppermost position of the guide member 200 relatively to the frame plates thereby preventing an implement from being hitched too high to the tractor and eliminating the probability of the tractor overturning during operation.

A drawbar 206 is provided comprising a bar member 208 and an extension member 210, the bar member 208 having a U-shaped end portion 212 for receiving and being swingingly connected to a bracket bar 214 by means of a pin 216 extending through the bar member and the bracket bar, and the bracket bar being U-shaped in formation and positioned beneath the frame bars 16 to which it is fixedly connected. The bar member 208 extends over and rests on the guide member 200 and is provided with an offset end portion 218 connected to the extension member 210 by means of a bolt.

The extension member 210 extends beneath the guide member 200 and is likewise provided with an offset end portion 220 which is connected to the bar member 208 by means of a bolt. The extension member 210 has the outer end portion 222 thereof bent back on itself and provided with an opening 224 therethrough for being connected to a structure such as a wagon, or an agricultural implement.

The bar member 208 and the extension member 210 are provided with a plurality of holes 226 for being adjustably connected together in order that the overall length of the drawbar may be varied to provide the most suitable length of hitch for the implement or equipment connected to the drawbar.

It will be noted that the guide member 200 is also provided with a plurality of holes 228 for receiving bolts 230 which may be positioned on opposite sides of the drawbar, as shown in Figure 5, and serve as stops for adjustably positioning the drawbar 206 laterally to provide the proper line of draft for the implement or equipment being drawn.

When the tractor is to be used with certain implements or ground working tools, it may be desirable to provide additional weight at the front of the tractor in which case hook bolts 232 (Figures 1 to 3) may be disposed on the frame bars 16 at the front thereof with the hook portions of the bolts receivable in recesses 234 in the motor supporting block 40, and one or more weights 236 may be positioned beneath the frame 12 and supported by the hook bolts 232 extending therethrough.

Modifications and changes may be made without departing from the spirit of the invention, and it is intended that the invention be limited only by the scope of the appended claims.

I claim:

1. A device of the character described comprising a pair of spaced apart frame members, a transmission housing supported by rear transport wheels and provided with a pair of spaced apart depending portions, said frame members being extended between the depending portions and connected to the transmission housing, a motor supporting body connected to the frame members at the front thereof, an oscillating cross beam positioned forwardly of and connected to the supporting body, and front wheels connected to and supporting the cross beam.

2. A device of the character described comprising a pair of spaced apart frame members, front and rear wheels for supporting the frame members, a transmission connected to the frame members and the rear wheels, a motor supporting body connected to the frame members at the front thereof, an oscillating cross beam connected to the motor supporting body, bracket members on which said front wheels are mounted, and means for connecting the bracket members to the cross beam, said bracket members being adjustable longitudinally of the cross beam for varying the distance between the front wheels.

3. A tractor comprising a frame, a beam transversely positioned at the front of the frame and operatively connected thereto, said beam being oscillatable vertically, a pair of brackets mounted on the beam and positioned on opposite sides of the frame, wheels mounted on the brackets, means for fastening the brackets to the beam, said brackets being adjustable longitudinally of the beam for varying the distance between the wheels, a steering mechanism carried by the frame, linkage for connecting the brackets to the steering mechanism, said linkage being adjustable to correspond to the spaced positions of the wheels, said linkage including outer arms connected to the brackets, an intermediate arm adjustably connected to the outer arms, a steering link connecting the intermediate and outer arms to the steering mechanism, and fastening means for connecting the intermediate arm to an outer arm, said fastening means being further adapted for connecting the steering link to the intermediate arm.

4. A tractor comprising a frame, a motor supporting body connected to the frame, a beam positioned transversely to the frame in front of the motor supporting body, wheels connected to the beam for supporting the frame, and means connecting the beam to the motor supporting body for permitting the beam to be oscillated relatively to said body, said means including a clamping member connected to the beam, and a shaft journalled in the motor supporting body and connected to the clamping member.

5. A tractor comprising a frame, wheels for supporting the frame, a motor carried by the frame and provided with a driving pulley, a transmission connected to the frame and the wheels and provided with a driven pulley, a belt disposed on said pulleys for transmitting power to the transmission, an idling pulley in engagement with the belt for holding the belt taut, a manually operable lever operatively connected to the idling pulley for controlling the tautness of the belt, and a guard member positioned adjacent a side of said belt for limiting lateral movement of the belt in a given direction and having a transverse portion positioned beneath the belt for supporting a portion of the belt when in a slack condition.

6. A tractor comprising a frame, wheels for supporting the frame, a motor carried by the frame and provided with a driving pulley, a transmission connected to the frame and the wheels and provided with a driven pulley, a belt disposed on said pulleys for transmitting power to the transmission, an idling pulley in engagement with the belt for holding the belt taut, a manually operable lever operatively connected to the idling pulley for controlling the tautness of the belt, a guard member positioned adjacent a side of said belt for limiting lateral movement of the belt in a given direction and having a transverse portion positioned beneath the belt for supporting a portion of the belt when in a slack condition, and a cowling for housing the motor, said cowling having a side portion extending on the other side of the belt from the guard for limiting lateral movement of the belt in the opposite direction.

WILLIAM L. ZINK.